July 21, 1936.  J. HUME  2,048,338
BRAKE HANGER
Filed Feb. 21, 1935
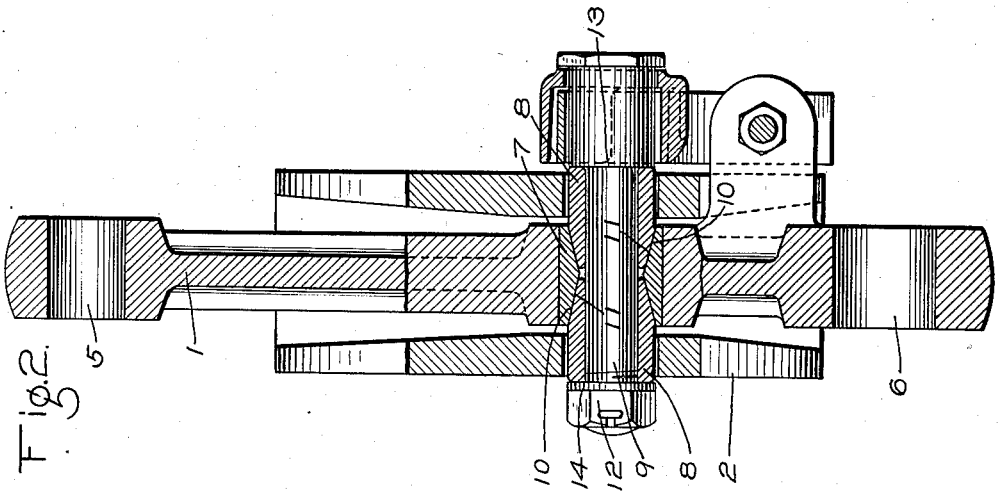
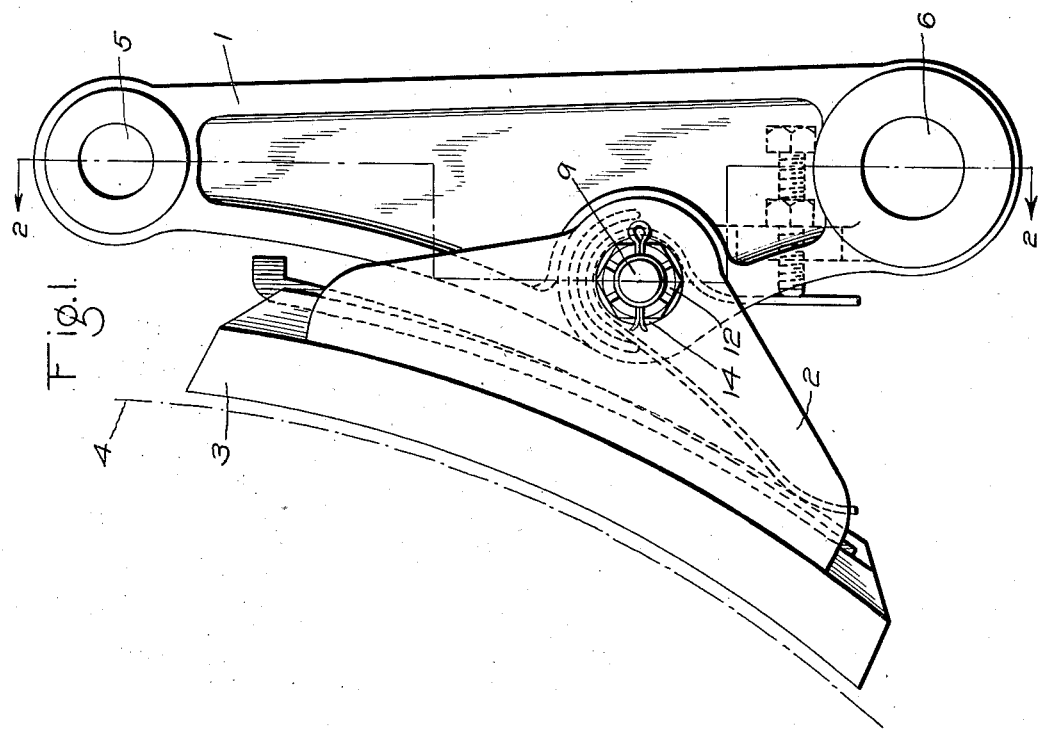
INVENTOR
JOHN HUME
BY *Wm. M. Cady*
ATTORNEY Patented July 21, 1936

2,048,338

UNITED STATES PATENT OFFICE 2,048,338

BRAKE HANGER

John Hume, Houston, Tex., assignor to The Westinghouse Air Brake Company, Wilmerding, Pa., a corporation of Pennsylvania Application February 21, 1935, Serial No. 7,545

6 Claims. (Cl. 188—206)

This invention relates to vehicle brakes and more particularly to railway locomotive and car brakes and has for its principal object the provision of improved means for preventing undesirable brake shoe chatter.

In some types of brake riggings, the brake shoe heads are connected directly to the brake levers through the medium of pins which pass through registering openings provided in the levers and heads. In this type of connection it has been the practice to employ a pin having the same diameter throughout its length, except for its head, and has been made to fit the openings in the lever and head in such a manner as to permit free relative pivotal movement between the lever and pin and between the brake shoe head and pin. When, due to wear, the pin accommodating openings in the lever and brake shoe head become enlarged or the cross sectional area of bearing portions of the pin becomes reduced, the lever will engage the pin on one side and the brake shoe head will engage the pin on the opposite side when the brake shoe, carried by the head, is in engagement with an adjacent wheel of the vehicle. It has been found that when this condition exists, the brake shoe head acts to cause a hammer-like action between the lever and pin and between the brake shoe head and pin when the brakes are being applied or released. This causes an undesirable noise known as brake shoe chatter and also causes excessive and rapid wear of the pin, brake shoe head and brake lever.

Another object of the invention is to provide an improved brake construction which will prevent any wear between the brake lever and the brake pin and thus eliminate the above objectionable features.

A further object of the invention is to provide a brake lever having separable rigid trunnions for connection with a brake shoe head.

Other objects and advantages will appear in the following more detailed description of the invention.

In the accompanying drawing, Fig. 1 is a side elevational view of a portion of a brake rigging embodying the invention and Fig. 2 is a vertical sectional view of the same taken on the line 2—2 of Fig. 1.

As shown in the drawing the brake lever 1 is of the hanger type commonly employed in locomotive brake rigging, and operatively carried by this lever is a brake shoe head 2 having mounted thereon a brake shoe 3 for frictional braking engagement with the tread of a wheel 4.

The lever adjacent its upper end is provided with an opening 5 which is adapted to accommodate a hanger pin mounted in the usual manner on the locomotive frame (not shown). Adjacent its lower end, the lever is provided with an opening 6 which is adapted to accommodate one end of the usual transversely extending brake beam or connecting bar (not shown).

The lever intermediate its ends is provided with an opening containing a bushing 7 which has a driven fit with the lever. The bushing is provided with a central bore which gradually tapers from its least diameter at a point between the ends of the bushing to its greatest diameter at each end of the bushing.

At each side of the lever is a trunnion 8 having a central bore for the accommodation of a securing pin or bolt 9. The outer surface 10 of the inner end of each trunnion 8 is made in the form of a frustrum of a cone and within the bore of the bushing engages a correspondingly shaped surface 11 defining one end of the bore in the bushing. Beyond the lever, the brake shoe head pivotally engages the outer end portion of the trunnion.

In assembling the several parts of the construction, the bushing is first driven into the accommodating opening in the lever, the brake shoe head is then positioned so that the trunnion accommodating openings therein are in registration with the bore in the bushing, the trunnions are then inserted through the openings in the brake shoe head into the bore in the bushing, the bolt 9 is then passed through the aligned trunnions 8 and a nut 12 is screwed on the screw-threaded end of the bolt. As the nut is thus being screwed on the bolt, a shoulder 13 on the bolt engages the outer end of the trunnion located on the right hand side of the lever and a washer 14 in engagement with the nut engages the outer end of the other trunnion, so that the trunnions are moved toward each other and the inner ends thereof are consequently drawn into close wedging engagement with the inner wedge-like surfaces of the bushing. It will be apparent that when the inner ends of the trunnions are in wedging engagement with the bushing as just described, the trunnions will be rigid with the lever, and since there is no relative movement permitted between the trunnion and bushing or between the bushing and the lever and since wear of the bolt 9 cannot take place, the hammer-like action caused in the construction when a loose bearing pin is employed cannot possibly occur.

It will be noted that the connection hereinbefore may be readily applied to brake riggings now in use without providing a new brake lever or brake shoe head by merely substituting a bushing 7 for the old bushing secured to the lever and adding the trunnions 8 and the bolt 9.

It will also be noted that since the trunnions are separable from the lever the ordinary brake shoe head may be used whereas if the trunnions were integral with the lever, a special type of brake shoe head would have to be employed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake lever having separable trunnions on which a brake shoe head is adapted to be operatively mounted, and removable means for rigidly securing said trunnions to said lever to prevent relative rotary movement between the trunnion and lever.

2. A brake lever having separable trunnions on which a brake shoe head is adapted to be operatively mounted, and means for clamping said trunnions into rigid engagement with said lever to prevent relative rotary movement between the lever and trunnion.

3. A brake lever having separable trunnions on which a brake shoe head is adapted to be operatively mounted, wedge means carried by said lever, wedge means carried by said trunnions adapted to cooperate with the wedge means carried by the lever to secure said trunnions rigidly to the lever to prevent relative rotary movement between the trunnions and lever, and means operative to move the wedge means carried by the trunnions into securing engagement with the wedge means carried by the lever.

4. A brake lever having separable trunnions on which a brake shoe head is adapted to be operatively mounted, a bushing secured to said lever against rotation relative to the lever, wedge means carried by said bushing, spaced aligned trunnions having inner end portions in the form of a frustrum of a cone, and means engaging the outer ends of said trunnions and operative to force the inner end portions of said trunnions into wedging engagement with the wedge means carried by the bushing to prevent relative rotary movement between the trunnions and bushing.

5. A brake lever having separable trunnions on which a brake shoe head is adapted to be operatively mounted, a bushing secured to said lever against rotation relative to the lever, wedge means carried by said bushing, spaced aligned trunnions having inner end portions in the form of a frustrum of a cone, and means engaging the outer ends of said trunnions and operative to force the inner end portions of said trunnions toward each other and into wedging engagement with the wedging means carried by the bushing to prevent relative rotary movement between the trunnions and bushing.

6. A brake lever having separable trunnions on which a brake shoe head is adapted to be operatively mounted, a removable bolt extending through said trunnions, a shoulder, said bolt engaging the outer end of one of said trunnions, and a nut cooperating with the outer end of the other of said trunnions and with said bolt for moving said trunnions into rigid securing engagement with said lever to prevent relative rotary movement between the trunnions and lever.

JOHN HUME.